Sept. 12, 1950   J. M. MARTINEZ ET AL   2,521,800
FLAT DRY PRIMARY BATTERY
Filed March 16, 1946   2 Sheets-Sheet 1
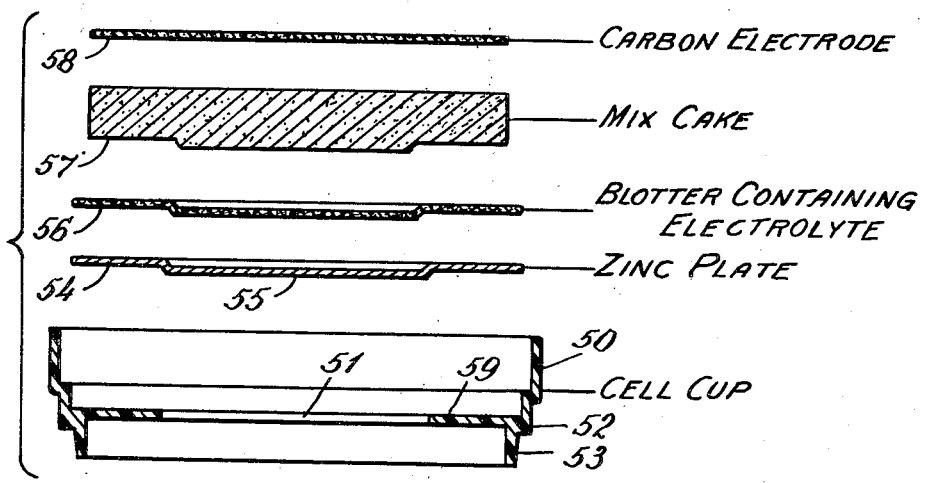
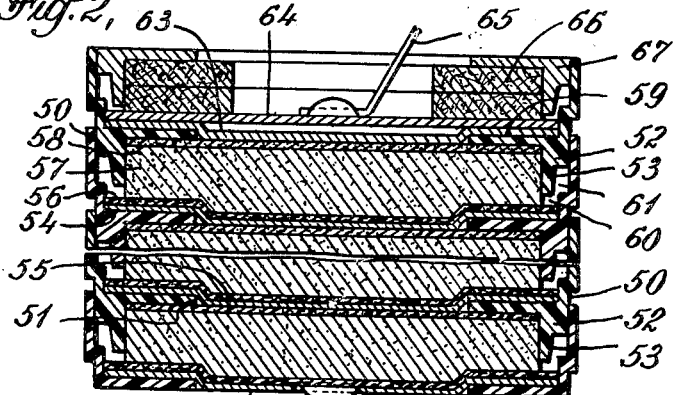
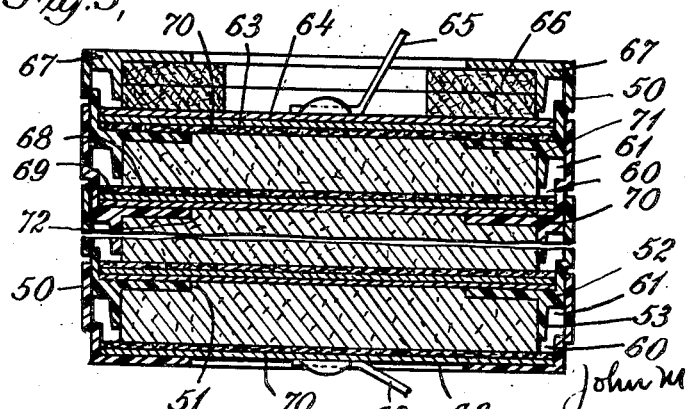
INVENTOR
John M. Martinez +
BY Otto K. Reinhardt
Pennie Edmonds Morton & Barrows
ATTORNEY

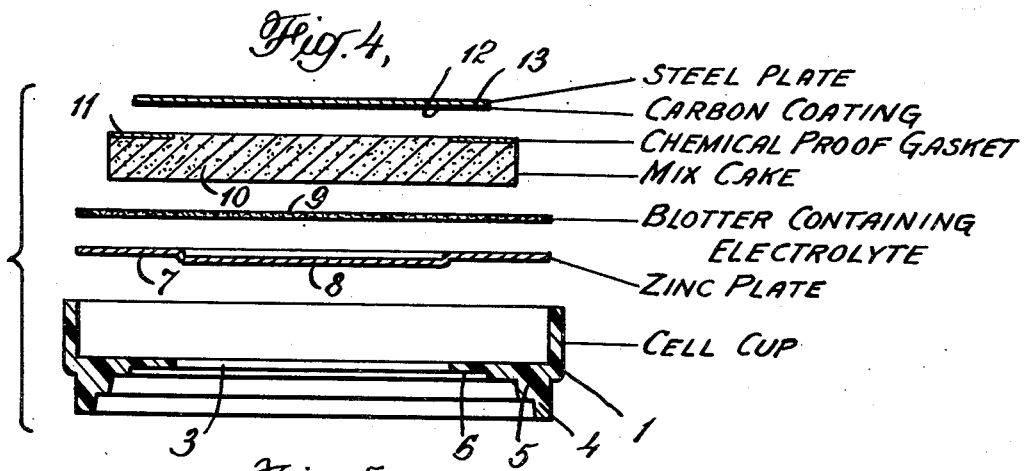
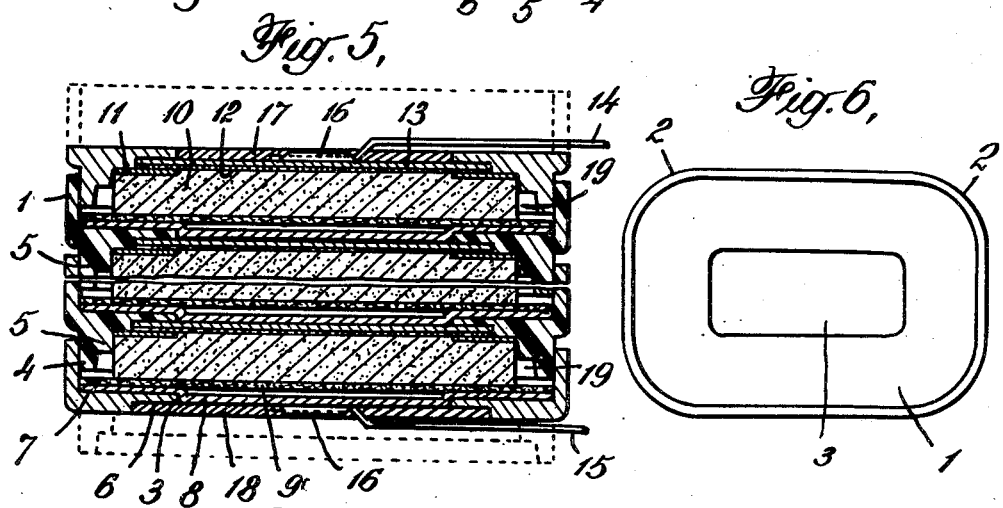
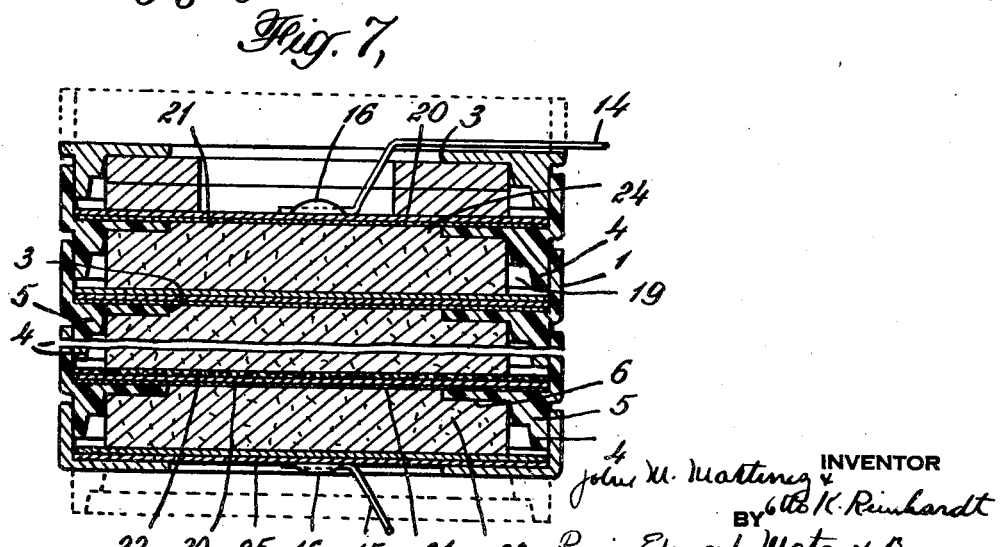

Patented Sept. 12, 1950

2,521,800

UNITED STATES PATENT OFFICE 2,521,800

FLAT DRY PRIMARY BATTERY

John M. Martinez and Otto K. Reinhardt, New Haven, Conn., assignors to Olin Industries, Inc.

Application March 16, 1946, Serial No. 654,904

5 Claims. (Cl. 136—111)

This invention relates to primary batteries and more particularly to batteries of the "flat type" consisting of a number of cells formed of flat elements.

In the present invention we provide a tray or container having a flange depending from the bottom a portion of the flange being spaced a distance from the edge equal to the thickness of the material from which the trays are made and being therefore adapted to be received within the side walls of the next adjacent tray to retain the trays in nested, assembled arrangement. The flange is also shaped to center the mix cake in the next lower cell and to provide an air space surrounding it. When a number of these trays containing cell elements are assembled, they may be placed under compression and secured to each other in various ways to provide a complete battery without the necessity of providing an outer casing. Thus, if thermoplastic materials are employed, the trays may be secured to each other by application of heat while under compression causing the flange of one tray to adhere to the side wall of the adjacent tray. They may likewise be secured to each other by means of any suitable cement or adhesive, preferably by immersing the assembly while under compression in a suitable solvent for the material from which the trays are made. Binding tapes may also be employed to strengthen the assembly, if desired.

The present construction is an improvement over prior battery constructions of this type in that the nesting of the cells does not depend on the use of tapered or stepped side walls and a more satisfactory construction is obtained due to the centering of the mix cake by the depending flange of the tray, and the provision of an air space surrounding the mix cake.

In the accompanying drawing we have shown several embodiments of the invention. In this showing:

Fig. 1 is a vertical, sectional view of the elements of a cell and of the tray in which the cell elements are shown, separated for clarity of presentation;

Fig. 2 is a similar view of a battery formed of a plurality of cells of the type shown in Fig. 1;

Fig. 3 is a vertical, sectional view of a battery showing a slight modification;

Fig. 4 is a view, similar to Fig. 1, showing another form of the invention;

Fig. 5 is a vertical, sectional view of a battery formed of a plurality of the cells shown in Fig. 4;

Fig. 6 is a plan view of one of the trays; and

Fig. 7 is a view similar to Fig. 5 showing another modification.

Referring to Figs. 1 and 2 of the drawing, the reference numeral 50 designates generally a tray, which can be made of any suitable shape, but which as shown is substantially rectangular in horizontal cross-section with rounded corners. This tray may be made of any dielectric material, but is preferably formed of a material that is thermoplastic to permit sealing of a plurality of trays containing cell elements to each other to form a battery of a plurality of cells. Any of the thermoplastic synthetic resins or other thermoplastic materials may be employed in manufacturing the tray. We may thus employ vinyl resins, various cellulose compounds and other materials possessing the desired dielectric properties and also possessing thermoplastic properties. The material employed in the manufacture of the tray is preferably of sufficient thickness to produce a substantially rigid tray to give sufficient strength to the assembly to eliminate the necessity of an outer casing. As the various materials which we contemplate using in the manufacture of the trays readily lend themselves to molding operations, the trays are preferably made in this way but of course can be made in any other way. The tray is substantially in the form of a cup having an open top and is provided with an opening 51 of substantial size in the bottom to permit contact between cell elements arranged therein and the cell elements in an adjacent tray. Depending downwardly from the bottom of the tray and spaced inwardly from the edge a distance equal to the thickness of the side walls of the tray, we provide a flange 52. The lower portion 53 of the flange is reduced in thickness as shown.

Each tray receives the elements of a cell and on the bottom of the tray we arrange a zinc plate 54 of substantially the same size as the area of the tray which forms the anode of the cell. The central portion of this plate is depressed as at 55 to project into the opening 51 in the bottom of the tray and arrange the bottom of the electrode substantially flush with the bottom of the tray to insure contact with the carbon electrode of the adjacent cell when a number of the trays are assembled to produce a battery. A sheet 56 of blotting paper, or other fibrous material, serving as a separator, is arranged on top of the zinc plate. The separator is preferably provided with a coating of paste on the side adjacent the zinc electrode and carries the usual electrolyte. A mix cake 57 is arranged on top of the separator and consists of a compressed cake of the usual depolarizing mix used in dry cells. It may thus consist of powdered carbon and manganese dioxide. The mix cake may also contain the usual electrolyte. On top of the mix cake and in contact therewith, we employ a carbon electrode 58. While any suitable form of flat cathode may be employed, we preferably employ a cathode consisting of a sheet of cloth or other sheet material impregnated with a conductive paint. The conductive paint may consist of a suitable conductive pigment, such as graphite or acetylene black, or a mixture of the two, dispersed in a suitable solution and applied to the cloth. The electrode per se forms no part of the present invention but is the subject matter of a copending application, Serial No. 656,203 filed March 22, 1946.

In Fig. 2 of the drawing a plurality of cells of the type described are assembled to form a battery. When so assembled, the flange 52 of the lower tray is of course removed. The areas of the tray which are in contact with the electrodes, that is the top and bottom surfaces of the bottom 59 of the tray are coated with a suitable material to provide a seal between each electrode and its containing tray. Materials suitable for this purpose are liquid petrolatum, oil or other electrolyte resisting material. When a number of the cells are assembled to form a battery, as shown in Fig. 2, the mix cake 57, being of a diameter equal to the inner diameter of the flange 52 is properly centered providing an air space 60 around the mix cake and the dimension of the lower portion 53 of the flange is such that the space 61 exteriorly of this flange also communicates with the space 60 to increase the available air space. A suitable lead 62 is connected to the zinc electrode of the bottom cell as shown. Above the cathode 58 of the top cell we provide a plate 63 similar to the zinc anode serving as a connection to a flat plate 64 of conductive metal to which the second lead wire 65 is connected by soldering or other suitable means. In the tray in which these two plates are arranged, we provide a suitable filling 66 of fibrous material, pitch or the like, and retain the parts assembled by means of an upper tray 67 consisting only of the bottom and the depending flanges.

When a plurality of cells are assembled, as shown in Fig. 2 of the drawing, they may be permanently secured to each other, preferably while under compression, by applying heat to cause the outer side of the flange of one tray to adhere to the inside of the wall of the adjacent tray or the trays may be secured to each other, while under compression by immersing the assembly in a suitable solvent for the material from which the trays are formed, for example, acetone, where the trays are made of a cellulose acetate-butyrate plastic. As the trays are assembled, the inner wall of the flange centers the mix cake and this wall may be slightly tapered to facilitate this operation.

In Fig. 3 of the drawing we have shown a battery employing duplex electrodes in which the zinc electrode is coated on one side with carbon. When duplex electrodes are employed in connection with the tray, the group of elements in each tray do not form a complete cell. The use of such arrangement is optional as is well known in the art. In this form of the invention we employ a substantially flat zinc electrode 68. In all of the cells, except the bottom cell, the electrode is provided with a coating 69 of conductive carbon to form the cathode of the cell in the tray immediately below it. A strip of absorbent paper 70 is arranged on the anode and the depolarizing mix 71 placed on it. As the elements of the cell are not bulged at the bottom to take up the thickness of the bottom of the tray and provide for intimate contact between the cell elements in each cell, the mix cake is provided with a central portion 72 of greater thickness which extends through the opening 51 in the bottom of the tray and thus is brought into intimate contact with the carbon coating on the zinc electrode of the next tray which carbon coating forms the cathode of the cell in the lower tray. It will be noted that the air space 60—61, the terminal connections and the top sealing of the cell of Fig. 3 are the same as that of Fig. 2.

Referring to Figs. 4 and 5 of the drawings there is shown a cell and battery substantially of the same construction shown in Figs. 1 and 2 but differing in some details. As there shown, we provide a tray 1, substantially rectangular in horizontal cross-section, having rounded corners 2. As heretofore shown, the bottom of the tray is provided with an opening 3 of substantial size. Depending from the bottom of the tray and spaced inwardly from the edge a distance equal to the thickness of the side wall we provide a flange 4. This flange may be provided with an enlarged portion 5 adjacent the bottom of the tray and the bottom of the tray may be provided with a recess 6. The zinc plate 7, of substantially the same area as the bottom of the tray is centrally depressed at 8 to project through the opening 3. A sheet of blotting paper or other absorbent paper 9 impregnated or soaked with electrolyte is arranged on the anode. A mix cake 10 of suitable depolarizing mix is placed on the separator. In the assembly, the upper edge of the mix cake is recessed to receive a gasket 11. The gasket may comprise a sheet of paper properly treated or impregnated to make it resistant to the electrolyte and is employed to prevent the electrolyte from penetrating beyond the carbon electrode of the cell. A cathode, which may be in the form of a coating of carbon paint 12, is arranged on one surface of a metal plate 13.

The elements of the cell shown in Fig. 4 are assembled to form a battery in the manner heretofore described. As shown in Fig. 5, terminal wires 14 and 15 are connected to the end electrodes of the battery, the terminal 14 being soldered directly to the steel plate 13 and the terminal 15 being soldered to the zinc electrode of the bottom cell as indicated at 16, or the terminals may be secured to the cell elements in any other suitable manner. The areas 17 and 18 which are provided when a plurality of cells are thus assembled may be filled with a suitable sealing compound, such as pitch.

The difference in the construction of the flange of the tray shown in Figs. 4 and 5 provides an air space 19, somewhat different from that shown in Figs. 1 to 2 but functioning in the same manner as heretofore described.

In Fig. 7 we have illustrated the tray of Figs. 4 and 5 in a battery having duplex electrodes. It is more desirable in a duplex electrode to utilize a flat sheet of zinc as otherwise the carbon coating might be broken if the zinc after coating were shaped to provide the depressed central portion 8 described in connection with Figs. 4 and 5. We therefore slightly modify the construction of the tray by eliminating the recess 6. In this form we provide a flat zinc electrode 20 having a coating 21 of conductive carbon paint on its lower surface which forms the cathode of the adjacent cell. A separator 22, similar to the separator 9, is placed over the anode and a mix cake 23 arranged above the separator. In this form of the invention the central portion of the mix cake is of greater thickness than the peripheral portions to extend through the opening 3, as shown at 24 and contact with the carbon coating of the next adjacent assembly of elements, which forms the cathode of the cell. The lower anode 25 is of course not provided with a carbon coating. Otherwise the parts are of the same construction as shown in Fig. 5 and similar reference numerals have been applied thereto.

We claim:

1. A primary battery comprising a plurality of substantially flat cell elements arranged in proper order to form a plurality of cells, said elements being arranged in groups, and a substantially rigid tray of dielectric material for each of said groups, each of said trays having side walls and a bottom provided with a central opening through which adjacent cells are in contact, a flange depending from the bottom of each of said trays and spaced inwardly from the side walls thereof and outwardly from the central opening in the bottom thereof, said flanges being snugly received within the side walls of the respective adjacent trays and being sealed to their inner surfaces.

2. A primary battery comprising a plurality of substantially flat cell elements arranged in proper order to form a plurality of cells, said elements being arranged in groups, and a substantially rigid tray of dielectric material for each of said groups, each of said trays having side walls and a bottom provided with a central opening through which adjacent cells are in contact, a flange depending from the bottom of each of said trays and spaced inwardly from the side walls thereof and outwardly from the central opening in the bottom thereof, said flanges being snugly received within the side walls of the respective adjacent trays and being sealed to their inner surfaces by means of a thermoplastic cement.

3. A primary battery comprising a plurality of substantially flat cell elements arranged in proper order to form a plurality of cells, said elements being arranged in groups, each group including a mix cake, and a substantially rigid tray of dielectric material for each of said groups, each of said trays having side walls and a bottom provided with a central opening through which adjacent cells are in contact, a flange depending from the bottom of each of said trays and spaced inwardly from the side walls thereof and outwardly from the central opening in the bottom thereof, said flanges being snugly received within the side walls of the respective adjacent trays, engaging the mix cakes of said respective adjacent trays to properly center them, and having lower portions of reduced thickness providing air spaces surrounding the respective mix cakes.

4. A primary battery comprising groups of substantially flat cell elements, each group consisting of an anode, a carbon electrode, a mix cake and a separator between the anode and the mix cake, and a substantially rigid tray of dielectric material for each of said groups, each of said trays having side walls and a bottom provided with a central opening through which adjacent cells are in contact, a flange depending from the bottom of each of said trays and spaced inwardly from the side walls thereof and outwardly from the central opening in the bottom thereof, said flanges being snugly received within the side walls of the respective adjacent trays, and being sealed to their inner surfaces, the inner side of each of the flanges engaging the mix cake of the adjacent tray to properly center it.

5. A primary battery comprising groups of substantially flat cell elements, each group consisting of an anode, a carbon electrode, a mix cake and a separator between the anode and the mix cake, and a substantially rigid tray of dielectric material for each of said groups, each of said trays having side walls and a bottom provided with a central opening through which adjacent cells are in contact, a flange depending from the bottom of each of said trays and spaced inwardly from the side walls thereof and outwardly from the central opening in the bottom thereof, said flanges being snugly received within the side walls of the respective adjacent trays, engaging the mix cakes of the respective adjacent trays to properly center them, and having lower portions of reduced thickness providing air spaces surrounding the respective mix cakes.

JOHN M. MARTINEZ.
OTTO K. REINHARDT.

REFERENCES CITED

The following references are of record in the file of this patent:

UNITED STATES PATENTS

| Number | Name | Date |
|---|---|---|
| 2,040,255 | Gordon | May 12, 1936 |
| 2,416,576 | Franz et al. | Feb. 25, 1947 |
| 2,418,442 | Wiencke | Apr. 1, 1947 |

FOREIGN PATENTS

| Number | Country | Date |
|---|---|---|
| 269,977 | Great Britain | Apr. 27, 1927 |
| 554,926 | Great Britain | July 26, 1943 |
| 104,123 | Sweden | Jan. 29, 1942 |